United States Patent Office 2,921,061
Patented Jan. 12, 1960

2,921,061
AZO DYESTUFFS CONTAINING CHROMIUM BOUND IN COMPLEX LINKAGE

Hans Ackermann, Riehen, near Basel, and Guido Schetty, Basel, Switzerland, assignors to J. R. Geigy A.-G., Basel, Switzerland, a Swiss firm No Drawing. Application May 27, 1957
Serial No. 661,594

Claims priority, application Switzerland June 5, 1956

6 Claims. (Cl. 260—147)

The present invention concerns new complex chromium compounds of azo dyestuffs having no sulphonic acid groups, as well as the production of these compounds. It is also concerned with the use of these dyestuffs for the dyeing of natural and synthetic polypeptide material as well as the goods fast dyed with them.

It has been found that valuable yellow, fast to light chromium complex dyestuffs are obtained if diazotised 2-aminobenzoic acids substituted in the 3-position are coupled with 5-pyrazolones and the monoazo dyestuffs containing no sulphonic acid groups obtained are treated with agents giving off chromium.

The new dyestuffs are distinguished from such metal complex dyestuffs having no suipnonic acid groups obtained from 2-aminobenzoic acids the ortho position to the primary amino group of which is free, by the valuable greenish shade of their dyeings on polypeptide material, the purity of the shades obtained however, not being less than that obtained with the latter group of dyestuffs. Up to now, such greenish yellow shades have only been attainable in practice with chromium complexes of o.o'-dihydroxyazo methine dyestuffs and with cobalt complexes of monoazo dyestuffs from diazotised o-aminophenol derivatives and acetoacetic acid amides. The dyeings with the instant new dyes are distinguished from the above named chromium complexes by a noticeably better fastness to light and from the cobalt complexes by an improved dischargeability.

The new chromium complex dyestuffs according to the present invention are obtained by treating with agents giving off chromium monoazo dyestuffs having no sulphonic acid groups obtained from 5-pyrazolones which may possibly be substituted in the 1-position and from diazonium compounds of 2-aminobenzoic acids of the general Formula I

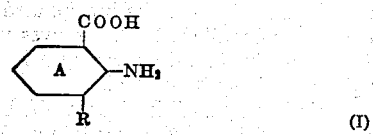

(I)

in which R represents a substituent usual in azo dyestuffs which does not hinder the diazotisation of the primary amino group and the coupling of the diazonium compound with the pyrazolone derivative or the formation of the chromium complex by way of the carboxyl group, and in which also the other hydrogen atoms of the benzene ring A can be replaced by substituents usual in azo dyestuffs.

The substituents usual in azo dyestuffs which fulfill the conditions given in the definition of R above are, for example, the following: halogen atoms, alkyl, aralkyl, and aryl groups, trifluoromethyl, cyano and nitro groups, alkyl-, aralkyl- and arylether or -thioether groups, alkyl- or aryl-keto groups, dialkyl- and acyl-alkyl amino groups, then in addition, alkyl-, aralkyl- and aryl-sulphonyl groups as well as alkyl-, cycloalkyl- and aryl-sulphoxide groups and, possibly sulphonic acid amide groups substituted at the nitrogen atoms. The diazotisation of the primary amino group in the 1-position is not hindered by substituents of this type. Also they do not deflect the coupling reaction from the desired aim such as can be done for example by a primary or secondary amino group by inner molecular reaction with the diazonium group while forming a 4.5-benzo-1.2.3-triazole derivative. Also substituents of the type mentioned in the ortho-position to the amino group in the 1-position do not hinder the formation of the chromium complex by way of the carboxyl group. However, because of its strong complex-forming power, a hydroxyl group, for example, in this position can result in the binding of the metal atom chiefly to this group.

Chiefly such compounds of the general Formula I in which R represents a mono-atomic substituent or a low molecular group are used as substituted 2-aminobenzoic acids according to the present application. Of particular value are those compounds in which this substituent is a halogen atom, in particular a chlorine atom, or an alkyl group, in particular a methyl or ethyl group.

In the 2-aminobenzoic acids according to the present invention which, as has already been stressed, contain no sulphonic acid groups, the other hydrogen atoms of the benzene nucleus can also be replaced. They may be replaced by the substituents usual in azo dyestuffs, e.g. by halogen atoms, alkyl, alkoxy, nitro, hydroxy, acyl-amino, alkyl- or- aryl-sulphonyl, acyl, carboxylic acid amide or arylamide groups or by the sulphonic acid amide group or, finally, by sulphonic acid amide groups derived from secondary aliphatic, araliphatic or heterocyclic basic amines.

Some of the 2-aminobenzoic acids of the general Formula I are known. They can be produced by known processes from known starting materials. They are obtained for example from correspondingly ortho-substituted anilines by treating these compounds with chloral hydrate and hydroxylamine, treating the isonitroso-acetanilides obtained with concentrated sulphuric acid and oxidising the isatin derivatives formed, in an alkaline medium, with hydrogen peroxide to form substituted aminobenzoic acids. Another process for the production of such 2-aminobenzoic acids consists in oxidising, possibly partially, 2-nitro or 2-acylamino toluenes substituted in the 3-position and then either reducing the nitro group or saponifying the acylamino group.

The substituted o-aminobenzoic acids according to the present invention are diazotised in the usual manner with sodium nitrite in mineral acid solution or suspension. It is also possible to diazotise them by the indirect method, i.e. by pouring the aqueous solution of a mixture of the alkali salts of the aminobenzoic acid and the nitrous acid into diluted mineral acids.

Pyrazolone derivatives used in the process according to the present invention as azo components are 5-pyrazolone and derivatives thereof substituted in the 1- and/or the 3-position but not containing sulphonic acid groups. Chiefly 3-alkyl-5-pyrazolones possibly also substituted in the 1-position, and in particular 3-methyl-5-pyrazolones are used.

These azo components are coupled with the diazonium compounds according to the present invention advantageously in aqueous acetic acid, neutral to alkaline solution or suspension of the components. The coupling may possibly be performed in the presence of tertiary nitrogen bases such as triethylamine, triethanolamine or pyridine which accelerate the coupling.

The monoazo dyestuffs obtained according to the present invention are chromed by treating them with oxides or salts of trivalent chromium, e.g. with chromic sulphate, chromic acetate, chromic fluoride or with chromium complex salts such as, e.g. oxalato, tartrato and lactato chromiates. Finally, also alkali salts of chromic acid can be used. These are reacted in the presence of reducing sugar in the warm. The metallisation is performed for example in aqueous solution or suspension, open or under pressure, possibly in the presence of organic solvents such as, e.g. ethyl alcohol, propanols, ethylene glycol or dioxan. It can also be performed in the melt of low fatty acid amides such as formamide, N.N-dimethyl formamide or acetamide. It is performed advantageously in weakly acid, neutral to alkaline medium, in the warm and with such amounts of compounds giving off chromium that two molecules of the monoazo dyestuffs according to the present invention are co-ordinatively bound to one chromium atom.

For the dyeing of textiles, the new chromium-containing azo dyestuffs are used advantageously in the form of their alkali salts, e.g. in the form of the lithium, sodium, potassium or also the ammonium salts, the salt formation, for example in the metallisation being attained by the addition of salts of these alkalies having a basic action. It is also possible to mix the metallised dyestuffs with slight amounts of basic salts or with non-ionogenic or anion active wetting and dispersing agents to attain better water solubility.

The new chromium-containing azo dyestuffs are suitable for the fast dyeing of natural and synthetic polypeptide fibres, in particular, wool, silk, synthetic polyamide and polyurethane fibres, as well as for the dyeing of leather. They produce greenish-yellow, clear shades on such material; the dyeings have very good fastness to light, good wet fastness properties and can be discharged well. Some of the complex chromium compounds according to the present invention are very valuable for the dyeing of lacquers having a basis of nitro or acetyl cellulose, as well as of acetyl cellulose spinning masses, very fast to light pure dyeings being attained.

Non-metallised monoazo dyestuffs according to the present invention are also suitable for the production of valuable so-called "mixed chromium complexes." Such compounds are obtained by treating with an agent giving off chromium a mixture of one molecule of a monoazo dyestuff according to the present invention and one molecule of another complex former having no sulphonic acid groups. This can be an o.o'-dihydroxyazo or an o-hydroxy-o'-carboxyazo dyestuff or also an uncoloured organic compound, e.g. from the group of aromatic o-hydroxycarboxylic acids. Such mixed chromium complex compounds can also be produced by adding a suitable complex former to a so-called "1:1 chromium complex" of a monoazo dyestuff according to the present invention produced in organic medium with excess chromic salt. By combining two suitably substituted components, particularly well soluble dyestuffs which draw well from a neutral medium can be obtained in this manner.

The following examples serve to illustrate the present invention without limiting it in any way. In the examples, the temperatures are in degrees centigrade and the parts are given as parts by weight where not otherwise stated.

EXAMPLE 1

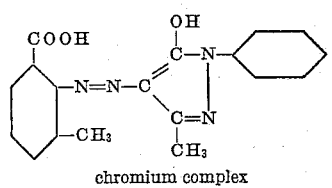

chromium complex 15.1 parts of 3-methyl-2-aminobenzene-1-carboxylic acid are dissolved warm in 200 parts of water and 17.5 parts of concentrated hydrochloric acid and an aqueous solution of 6.9 parts of sodium nitrite are added at 0–5°. Sodium bicarbonate is added to the clear solution of the diazonium compound until the Congo acid reaction disappears, whereupon it is poured into a solution of 18.3 parts of 1-phenyl-3-methyl-5-pyrazolone and 12 parts of anhydrous sodium carbonate in 1000 parts of water which has been cooled to 5°. The dyestuff which forms very quickly and almost completely precipitates, is filtered off under suction, washed with cold water and dried. The pulverised dyestuff in 400 parts of formamide is heated for about 30 minutes at 120–130° with chromic acetate, corresponding to 2.86 parts of chromium. The brown-yellow solution of the chroming mixture is poured into 1000 parts of 5% sodium chloride solution and the chromium complex dyestuff which precipitates is filtered off. It dyes wool and polyamide fibres from neutral or weakly acid bath in greenish-yellow shades which are very fast to light.

Similar dyestuffs are obtained if, instead of 18.3 parts of 1-phenyl-3-methyl-5-pyrazolone, 21.9 parts of 1-(2'-chlorophenyl)-3-methyl-5-pyrazolone or 19.7 parts of 1-(4'-methylphenyl)-3-methyl-5-pyrazolone are used.

EXAMPLE 2

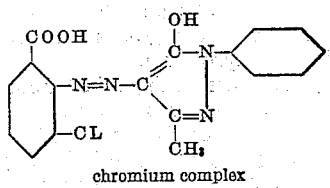

chromium complex 17.25 parts of 3-chloro-2-aminobenzene-1-carboxylic acid are dissolved in 100 parts of water and 10 parts by volume of 10 N-caustic soda lye, an aqueous solution of 7.0 parts of sodium nitrite is added and the whole is added dropwise at 0–5° to a solution of 29 parts of concentrated hydrochloric acid in 100 parts of water. The excess hydrochloric acid is buffered with bicarbonate and the clear solution of the diazonium compound is poured into a solution of 18.3 parts of 1-phenyl-3-methyl-5-pyrazolone and 12 parts of anhydrous sodium carbonate in 1000 parts of water which has been cooled to 5°. The dyestuff which forms quickly soon completely precipitates. It is filtered off under suction, washed with cold water and dried. The pulverised dyestuff is heated at 120–130° in 300 parts of glycol with chromic acetate, corresponding to 3.12 parts of chromium until the metallisation is complete. The chroming mixture is poured into 1000 parts of 5% sodium chloride solution and the precipitated chromium containing dyestuff is filtered off. It dyes wool and polyamide fibres from a neutral or weakly acid bath in very fast to light, greenish-yellow shades.

A similar dyestuff is obtained if, instead of 18.3 parts of 1-phenyl-3-methyl-5-pyrazolone, 21.2 parts of 1-(2'-ethylphenyl)-3-methyl-5-pyrazolone are used.

Table

The table contains the components of other chromium containing azo dyestuff which can be produced according to Examples 1 and 2. All dyestuffs produce fast greenish-yellow shades on wool.

| No. | Diazo component | Azo component |
|---|---|---|
| 1 | 3-methyl-2-aminobenzene-1-carboxylic acid. | 1-(4'-methoxyphenyl)-3-methyl-5-pyrazolone. |
| 2 | ....do.... | 1-(4'-ethoxyphenyl)-3-methyl-5-oyrazolone. |
| 3 | ....do.... | 1-(3'-sulphamidophenyl)-3-methyl-5-pyrazolone. |
| 4 | 3-chloro-2-aminobenzene-1-carboxylic acid. | Do. |

Table—Continued

| No. | Description | Azo component |
|---|---|---|
| 5 | 3-ethyl-2-aminobenzene-1-carboxylic acid. | 3-methyl-5-pyrazolone. |
| 6 | ----do---- | 1-methyl-3-methyl-5-pyrazolone. |
| 7 | 3-chloro-2-aminobenzene-1-carboxylic acid. | 1-(2'-chlorophenyl)-3-methyl-5-pyrazolone. |
| 8 | 3,5-dichloro-2-aminobenzene-1-carboxylic acid. | 1-phenyl-3-methyl-5-pyrazolone. |
| 9 | ----do---- | 1-(2'-chlorophenyl)-3-methyl-5-pyrazolone. |
| 10 | 3,5-dibromo-2-aminobenzene-1-carboxylic acid. | 1-phenyl-3-methyl-5-pyrazolone. |
| 11 | 3-methane sulphonyl-2-aminobenzene-1-carboxylic acid. | 1-(3'-chlorophenyl)-3-methyl-5-pyrazolone. |
| 12 | ----do---- | 1-benzyl-3-methyl-5-pyrazolone. |
| 13 | 3-methoxy-6-chloro-2-aminobenzene-1-carboxylic acid. | 1-phenyl-3-methyl-5-pyrazolone. |
| 14 | 3-methyl-2-aminobenzene-1-carboxylic acid. | Do. |
| 15 | 3,5-dimethyl-2-aminobenzene-1-carboxylic acid. | 3-methyl-5-pyrazolone. |
| 16 | ----do---- | 1-methyl-3-methyl-5-pyrazolone. |
| 17 | 3-chloro-2-aminobenzene-1-carboxylic acid. | 1-(α-phenylethyl)-3-methyl-5-pyrazolone. |
| 18 | ----do---- | 1-butyl-3-methyl-5-pyrazolone. |
| 19 | 3-chloro-5-ethyl-2-aminobenzene-1-carboxylic acid. | 1-benzyl-3-methyl-5-pyrazolone. |

EXAMPLE 3

100 parts of wool are entered at 40° into a dyebath containing 4000 parts of water, 2 parts of the dyestuff according to Example 1 and 3 parts of ammonium acetate. The bath is brought to the boil within 30 minutes and kept at the boil for 1 hour. The liquor is exhausted for all practical purposes. The wool, which has been dyed in level, greenish-yellow shades, is rinsed and dried.

The dyestuffs given in Example 2 and in the table can also be dyed in the same way.

What we claim is:

1. A complex chromium compound which contains one atom of chromium bound in complex union with two molecules of a dyestuff of the general formula:

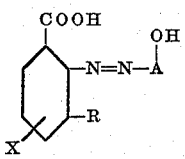

wherein:

R represents a member selected from the group consisting of lower alkyl and chlorine, X represents a member selected from the group consisting of hydrogen, lower alkyl and chlorine, A—OH represents the radical of a 3-methyl-5-pyrazolone coupling component bound to the azo group in 4-position.

2. The complex chromium compound which contains one atom of chromium bound in complex union with two molecules of a dyestuff of the formula:

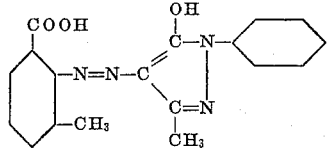

3. The complex chromium compound which contains one atom of chromium bound in complex union with two molecules of a dyestuff of the formula:

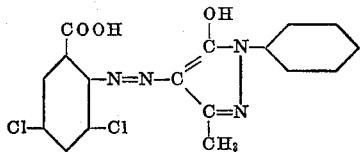

4. The complex chromium compound which contains one atom of chromium bound in complex union with two molecules of a dyestuff of the formula:

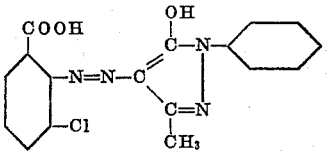

5. The complex chromium compound which contains one atom of chromium bound in complex union with two molecules of a dyestuff of the formula:

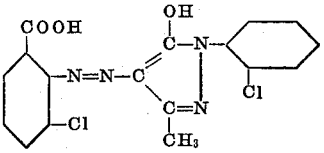

6. The complex chromium compound which contains one atom of chromium bound in complex union with two molecules of a dyestuff of the formula:

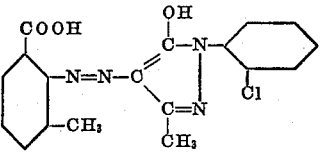

References Cited in the file of this patent

UNITED STATES PATENTS

| | | |
|---|---|---|
| 2,775,581 | Neier et al. | Dec. 25, 1956 |
| 2,832,762 | Zickendraht et al. | Apr. 29, 1958 |